(12) United States Patent
Han et al.

(10) Patent No.: US 7,499,191 B2
(45) Date of Patent: Mar. 3, 2009

(54) APPARATUS FOR TRANSMITTING PRINT DATA USING MULTIPLE VIRTUAL CONNECTIONS AND A METHOD THEREOF

(75) Inventors: Sang-eun Han, Gwacheon-si (KR); Byoung-yue Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 946 days.

(21) Appl. No.: 10/891,091

(22) Filed: Jul. 15, 2004

(65) Prior Publication Data

US 2005/0157328 A1 Jul. 21, 2005

(30) Foreign Application Priority Data

Jan. 20, 2004 (KR) ...................... 10-2004-0004273

(51) Int. Cl.
*G06F 15/00* (2006.01)
*G06F 15/16* (2006.01)

(52) U.S. Cl. ...................................... 358/1.15; 709/227

(58) Field of Classification Search ................. 358/1.15, 358/1.13, 1.14; 709/223, 227–228; 455/435.1, 455/426.1, 432.1; 370/401, 446, 470, 474, 370/501; 725/32, 45, 135
See application file for complete search history.

(56) References Cited

U.S. PATENT DOCUMENTS 6,222,635 B1 * 4/2001 Gotoh ....................... 358/1.15

FOREIGN PATENT DOCUMENTS

| JP | 05073232 | 3/1993 |
|----|----------|--------|
| JP | 2002082780 | 3/2002 |
| KR | 1020030084217 | 11/2003 |

* cited by examiner

*Primary Examiner*—Saeid Ebrahimi Dehkordy
(74) *Attorney, Agent, or Firm*—Roylance, Abrams, Berdo & Goodman, LLP

(57) ABSTRACT

An apparatus for transmitting print data using multiple virtual connections and a method thereof capable of greatly improving a data transmission speed by forming a plurality of virtual connections, dividing the print data, and simultaneously transmitting the divided data through the virtual connections. The method includes receiving the print data and obtaining information on a total length (TL) of the print data and maximum virtual connections (MC), acquiring real virtual connections (RC) by attempting the virtual connections to a printing device the same number of times as the number of maximum virtual connections, and transmitting divided data to the printing device through the real virtual connections.

7 Claims, 4 Drawing Sheets

APPARATUS FOR TRANSMITTING PRINT DATA USING MULTIPLE VIRTUAL CONNECTIONS AND A METHOD THEREOF

CROSS-REFERENCE TO RELATED APPLICATIONS

This application claims benefit under 35 U.S.C. § 119(a) of Korean Patent Application No. 2003-4273, filed on Jan. 20, 2004, the entire contents of which are incorporated herein by reference.

BACKGROUND OF THE INVENTION

1. Field of the Invention

The present invention relates generally to an apparatus for transmitting print data and a method thereof. More particularly, the present invention pertains to an apparatus for transmitting print data using multiple virtual connections and a method thereof which can transmit data at a high speed by forming at least one virtual connection between a host and a printing device when a large amount of print data is transmitted to the printing device through a network.

2. Description of the Related Art

FIG. 1 is a block diagram of a conventional print data transmitting apparatus. Referring to FIG. 1, the conventional print data transmitting apparatus includes a host 5 and a printing device 10. The host and the printing device 10 are connected to each other through a network.

The host 5 includes an application program storage 1, a printing driver part 2, a port monitor 3, and a first network driver part 4. The printing device 10 includes a printing part 6, a printing server 7, a storage 8 and a second network driver part 9.

After executing an application program stored in the application program storage 1, a user requests a printing operation based on a printing function of the application program being executed. The application program indicates a program provided with a printing function such as Microsoft Word, for example.

The printing driver part 2 converts print data requested by the user into content that can be recognized by the printer 10. To transmit the print data converted by the printing driver part 2 to the printer 10, the port monitor 3 and the printing server 7 of the printer 10 establish one connection, and then transmit the print data. After the transmission of the print data is completed, the connection between the port monitor 3 and the printing server 7 is terminated. In FIG. 1, a dotted line connecting the port monitor 3 and the printing server 7 denotes a virtual connection, and the number of connections is one.

FIG. 2 is a block diagram of another conventional print data transmitting apparatus. Referring to FIG. 2, this conventional print data transmitting apparatus includes a host 15 and a printer 20, and the host 15 and the printer 20 are connected through a network.

The host 15 includes a first storage 11, a printing-dedicated program storage 12, and a first network driver part 13. The printer 20 includes a printing part 16, a printing server 17, a second storage 18 and a second network driver part 19.

The user may request a printing operation using the printing-dedicated program instead of a general application program having a printing function. When using the printing-dedicated program, the print data is directly transmitted to the printing server 17 of the printer 20 without any conversion of the print data. Referring back to FIG. 2, a dotted line connecting the printing-dedicated program storage 12 and the printing server 17 denotes a virtual connection, and the number of connections is one.

A Universal Plug and Play (UpnP) control device program or an Internet Printing Protocol (IPP) client program may be used as the printing-dedicated program. A general Line Printer Request/Line Printer Daemon (LPR/LPD) server or a Raw Transmission Control Protocol/Internet Protocol (TCP/IP) server may be used as the printing server.

As described, the conventional print data transmitting apparatus uses only one virtual connection when the host transmits the print data to the printer connected to the host through the network. Accordingly, the transmission speed is low if the print data is large.

SUMMARY OF THE INVENTION

The present invention has been developed in order to solve the above drawbacks and other problems associated with the conventional arrangement. An aspect of the present invention is to provide an apparatus for transmitting print data using multiple virtual connections and a method thereof which can perform high-speed data transmission by forming at least one virtual connection and then separately transmitting the data through the at least one virtual connection when the print data is transmitted to a printing device connected to a host.

The foregoing and other aspects and advantages are substantially realized by providing a method of transmitting print data to a printing device through a network using multiple virtual connections. The method comprises the steps of receiving the print data and obtaining information on a total length (TL) of the print data and the number of maximum virtual connections (MC), acquiring the number of real virtual connections (RC) by attempting the virtual connections to the printing device the same number of times as the number of the maximum virtual connections, and transmitting divided data to the printing device through the real virtual connections.

It is preferable that the maximum number of virtual connections is preset by a user. If it is not preset by the user, it is preset by a system.

It is preferable that the acquiring step attempts the virtual connection to the printing device by repeatedly generating as many threads as the maximum virtual connections. If the virtual connection succeeds, the acquiring step increases the number of real virtual connections by one connection.

It is preferable that if the number of real virtual connections is '0', the acquiring step indicates a print failure error and terminates the printing operation.

Advantageously, the method according to an embodiment of the present invention further includes, calculating a chunked length (CL) of the divided data for the print data and offsets where the divided data are located based on the total length of the print data and the real virtual connections if the number of real virtual connections RC is at least one at the acquiring step, and then transmitting information on the total length of the print data, information on the chunked length of the divided data, and information on the offsets to the printing device through the respective virtual connections.

In another aspect of the present invention, there is provided an apparatus for transmitting print data from a host to a printing device through a network using multiple virtual connections, which includes a printing library for receiving the print data and obtaining information on a total length (TL) of the print data and the number of maximum virtual connections (MC), acquiring the number of real virtual connections (RC) by attempting the virtual connections to the printing device the same number of times as the number of the maximum virtual connections, and then transmitting divided data to the printing device through the real virtual connections, and a first network driver part for physically connecting to the printing device.

It is preferable that the printing library includes a data input part for receiving the print data and obtaining the information on the total length of the print data and the maximum virtual connections, a first connection processing part for attempting the virtual connections to the printing device by repeatedly attempting as many threads as the number of the maximum virtual connections, if the virtual connection succeeds, increasing the number of real virtual connections by one connection. If the virtual connection fails, the first connection processing part terminates the generated threads, and if the number of real virtual connections is at least one, calculates a chunked length (CL) of the divided data for the print data and offsets where the divided data are located based on the total length of the print data and the number of the real virtual connections. The printing library also preferably includes a data transmitting part for transmitting the information on the total length of the print data, the information on the chunked length of the divided data, the information on the offsets, and the divided data to the printing device through the virtual connections.

It is preferable that the printing device includes a second connection processing part for receiving and processing connection and release requests from the printing library, a data receiving part for receiving the information on the total length of the print data, the information on the chunked length of the divided data, the information on the offsets where the divided data are located, and the divided data, a second storage for matching the divided data to the offset information and storing the matched divided data, a data transferring part for receiving and outputting all data from the second storage, a printing part for receiving the print data from the data transferring part and performing a printing operation accordingly, and a second network driver part for physically connecting the host and the printing device.

It is preferable that the host and the printing device are connected through any one of a parallel port, an IEEE 1394 port, a Universal Serial Bus (USB) port, and a Bluetooth port.

BRIEF DESCRIPTION OF THE DRAWING FIGURES

The above aspects and features of the present invention will now be more apparent by describing certain embodiments of the present invention with reference to the accompanying drawing figures, in which.

Figure 4:
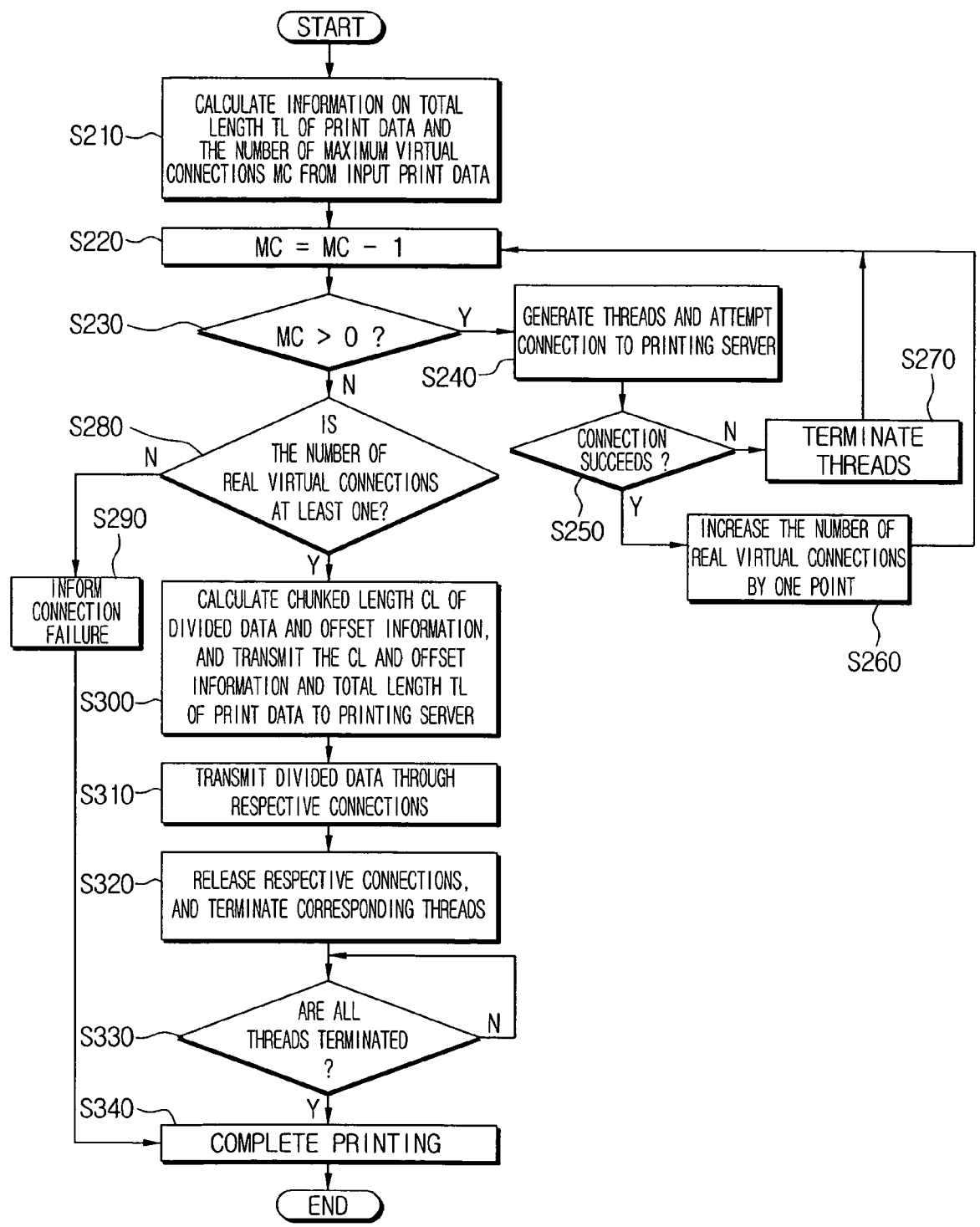
Figure 5:
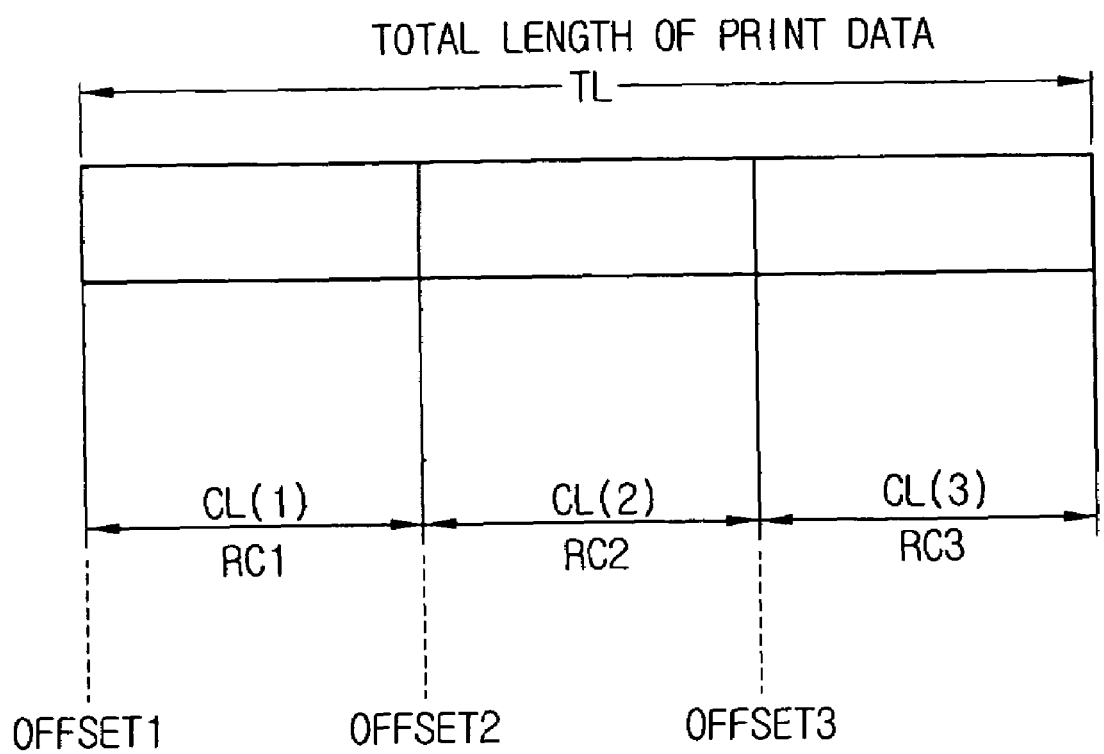

FIG. 4 is a flowchart illustrating exemplary steps of a print data transmitting method using multiple virtual connections according to an embodiment of the present invention; and FIG. 5 is a view illustrating a result of calculating the chunked length (CL) of the divided data and the offset information where the divided data are located on the basis of the total length (TL) of the print data and the real virtual connections (RC).

In the following description, it should be understood that the same drawing reference numerals are used for the same elements throughout the drawing.

DETAILED DESCRIPTION OF THE EXEMPLARY EMBODIMENTS

Exemplary embodiments of the present invention will be described in greater detail with reference to the accompanying drawing figures.

The matters defined in the description such as a detailed construction and elements are used as examples to provide a better understanding of the present invention. Thus, it should be understood that the present invention can be performed without the specific examples. Also, well-known functions or constructions are not described in detail since they would unnecessarily obscure the invention.

Figure 1:
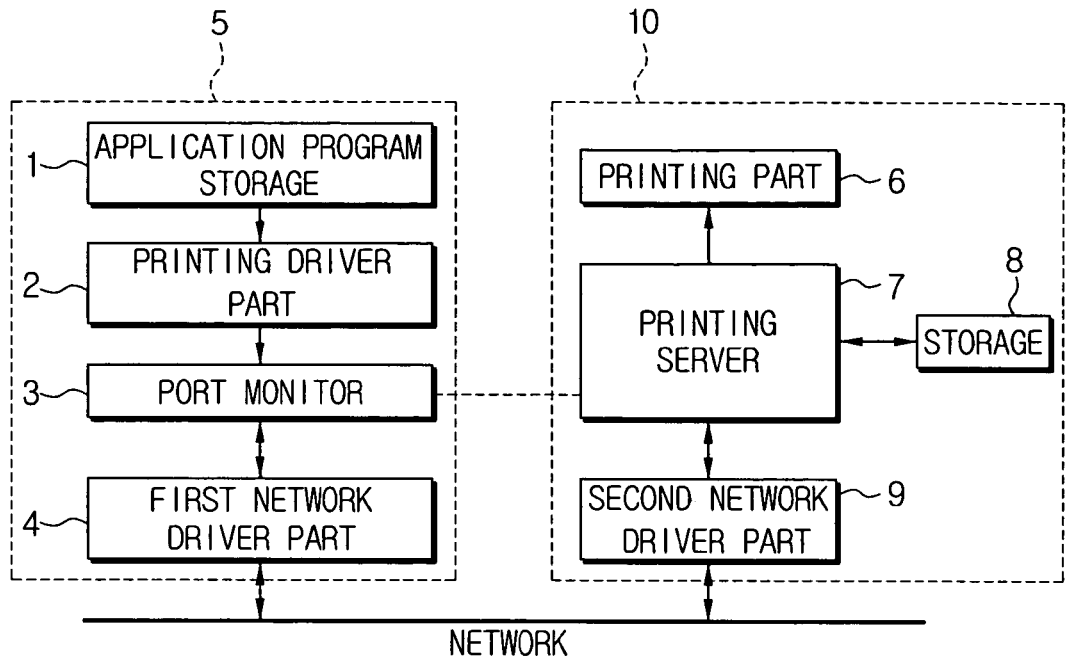
FIG. 1 is a block diagram of a conventional print data transmitting apparatus.
Figure 2:
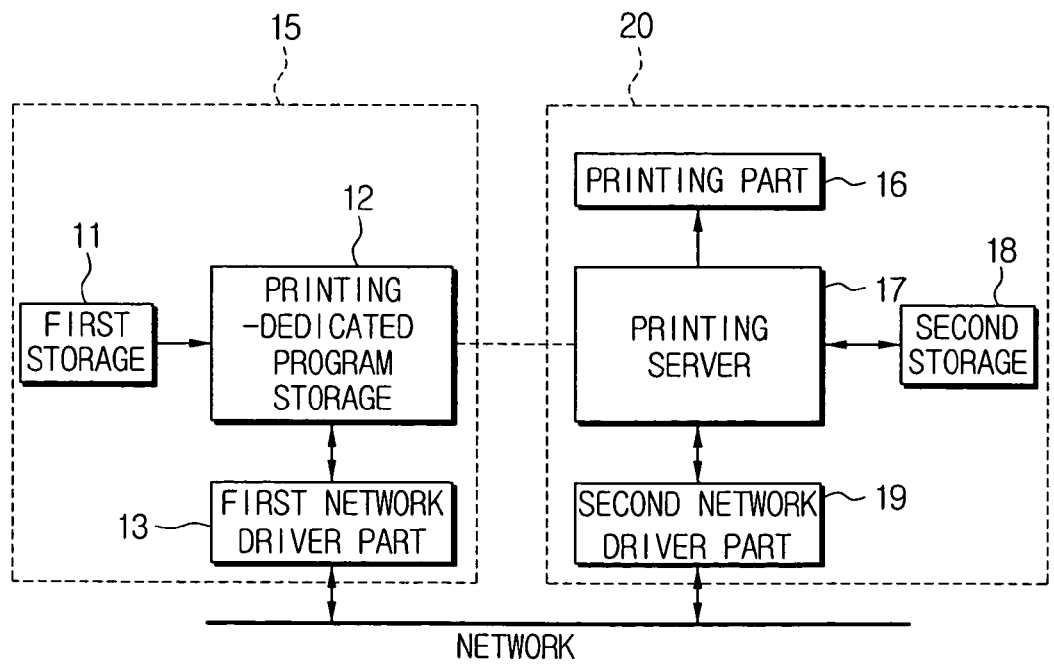
FIG. 2 is a block diagram of another conventional print data transmitting apparatus.
Figure 3:
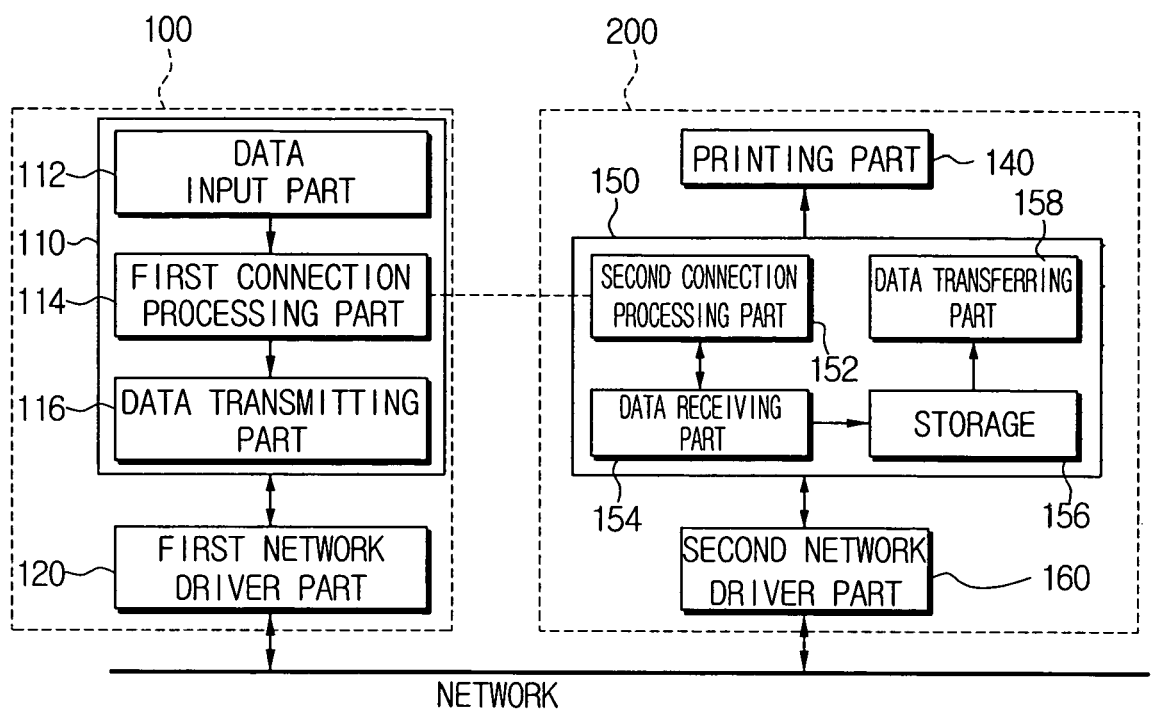
FIG. 3 is a block diagram illustrating the construction of a print data transmitting apparatus using multiple virtual connections according to an embodiment of the present invention.

FIG. 3 is a block diagram illustrating the construction of a print data transmitting apparatus using multiple virtual connections according to an embodiment of the present invention. Referring to FIG. 3, the print data transmitting apparatus using multiple virtual connections according to an embodiment of the present invention includes a host 100 and a printing device 200. The host 100 and the printing device 200 are connected via a network so that they can communicate with each other.

The host 100 includes a printing library 110 and a first network driver part 120. The printing library 110 includes a data input part 112, a first connection processing part 114, and a data transmitting part 116.

The printing device 200 includes a printing part 140, a printing server 150, and a second network driver part 160. The printing server 150 includes a second connection processing part 152, a data receiving part 154, a storage 156, and a data transferring part 158. In FIG. 3, a dotted line between the printing library 110 and the printing server 150 indicates at least one virtual connection.

The data input part 112 receives the print data, and calculates information on the total size (TL) of the print data and the maximum virtual connections (MC) preset by a user. If the number of the maximum virtual connections is not preset by the user, it is determined by the system.

The first connection processing part 114 attempts a virtual connection of the printing server 150 of the printing device 200 by repeatedly generating as many threads as the number of maximum virtual connections. The thread refers to an independent program part that is executed in an application program, and the respective threads perform the same function.

If the virtual connection succeeds, the first connection processing part 114 increases the number of the real virtual connections (RC) by one connection. If the virtual connection fails, the first connection processing part 114 terminates the generated thread.

If the number of real virtual connections is at least one, the first connection processing part 114 calculates a chunked length (CL) of the divided data and offsets where the divided data are located on the basis of the total length of the print data and the real virtual connections.

The data transmitting part 116 transmits information on the total length of the print data, information on the lengths of the divided data, information on the offsets, and the divided data to the printing device 200 through the respective virtual connections.

The second connection processing part 152 of the printing device 200 receives and processes virtual connection and release requests from the printing library 110. The data receiving part 154 receives the print data from the printing library 110 through the respective virtual connections, and stores the received data. The data transferring part 158 receives all the data stored in the storage 156, and then transfers the data to the printing part 140.

According to an embodiment of the present invention, the network physically connects the host 100 and the printing device 200. It is preferable that a parallel port, an IEEE 1394 port, a Universal Serial Bus (USB) port, or a Bluetooth port may be applied to this network, although embodiments of the present invention could include a wireless network such as an IEEE 807.11(b) network, as well.

FIG. 4 is a flowchart illustrating a print data transmitting method using multiple virtual connections according to an embodiment of the present invention.

Referring to FIGS. 3 and 4, to print the print data, the user starts the printing operation using a general program having a printing function, or starts the printing operation by executing a printing-dedicated program and then directly selecting the data to be printed.

The user presets the maximum virtual connections required for transmitting the print data to the printing device 200. If the number of the maximum virtual connections is not preset by the user, it is determined by the system.

Next, the information on the total length of the print data and the maximum virtual connections set by the user, is obtained on the basis of the input print data at step S210.

'MC=MC−1' is calculated from the maximum virtual connections set by the user at step S220. Using a result of calculation, it is confirmed whether the number of the maximum virtual connections is '0' or more at step S230.

If the number of the maximum virtual connections is '0' or more, the threads are generated and the connection to the printing server 150 is attempted at step S240. Next, it is confirmed whether the virtual connection succeeds at step S250.

If the virtual connection to the printing server 150 succeeds, the number of real virtual connections is increased by one point at step S260. The number of real virtual connections represents the number of successes in real virtual connections to the printing server 150, and may be smaller than the number of the maximum virtual connections set by the user. If the virtual connection to the printing server 140 fails, the generated threads are terminated at step S270.

The steps S230 and S240 are set for the user to repeat the above-described process as many times as the number of the maximum virtual connections preset by the user.

After the above-described process is repeated as many times as the number of maximum virtual connections preset by the user, it is confirmed whether the number of the real virtual connections is at least one at step S280. If there is no real virtual connection to the printing server 150, the print failure indication is provided to the program that has requested the printing at step S290.

If the number of real virtual connections is at least one, a chunked length of the divided data and offsets where the divided data are located, are calculated based on the information on the total length of the print data and the real virtual connections. The chunked length of the divided data is calculated by dividing the total length of the print data by the number of real virtual connections.

FIG. 5 is a view illustrating a result of calculating the chunked length of the divided data and the offset information where the divided data are located on the basis of the total length of the print data and the real virtual connections. In FIG. 5, the number of real virtual connections is set to 3 by way of example. FIG. 5 will be described with respect to steps S300 to S340 of FIG. 4.

The respective threads transmit the information on the total length of the print data, the information on the chunked length of the divided data, and the offset information to the printing server 150 through the virtual connections at step S300.

Thereafter, the threads transmit the divided data to the printing server 150 through the virtual connections at step S310. The divided data are transmitted later to allow the printing server 150 to receive the divided data using the information on the chunked length of the divided data and the offset information that were first input.

If the respective threads complete the transmission of the divided data through the virtual connections, the respective virtual connections are released and the corresponding threads are terminated at step S320. The storage 156 of the printing server 150 sequentially stores the transmitted divided data, starting from the positions of the respective offsets. The print data is transmitted to the printing part 140 through the data transferring part 158.

Next, it is confirmed whether all of the threads are terminated at step S330. If all of the threads are terminated, the printing operation is completed at step S340.

As described, the transmission speed can be greatly improved by forming a plurality of virtual connections among the host and the printing device, dividing the print data, and simultaneously transmitting the divided data through the virtual connections.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method of transmitting print data to a printing device through a network using multiple virtual connections, comprising:

receiving the print data, and obtaining information on a total length (TL) of the print data and the number of maximum virtual connections (MC);

acquiring the number of real virtual connections (RC) by attempting the virtual connections to the printing device the same number of times as the number of the maximum virtual connections; and transmitting divided data to the printing device through the real virtual connections where, if the number of real virtual connections is at least one at the acquiring step, calculating a chunked length (CL) of the divided data for the print data and offsets where the divided data are located based on the total length (TL) of the print data and the real virtual connections, and transmitting information on the total length of the print data, information on the chunked length of the divided data, and information on the offsets to the printing device through the respective virtual connections.

2. The method as claimed in claim 1, wherein the maximum number of virtual connections MC is preset by a user, and if it is not preset by the user, it is preset by a system.

3. The method as claimed in claim 1, wherein the acquiring step attempts the virtual connection to the printing device by repeatedly generating as many threads as the number of maximum virtual connections, and if the virtual connection succeeds, it increases the number of real virtual connections by one connection.

4. The method as claimed in claim 1, wherein, if the number of real virtual connections is '0', the acquiring step indicates a print failure and terminates the printing operation.

5. An apparatus for transmitting print data from a host to a printing device through a network using multiple virtual connections, comprising:
   a printing library for receiving the print data and obtaining information on a total length (TL) of the print data and the number of maximum virtual connections (MC), acquiring the number of real virtual connections RC by attempting the virtual connections to the printing device the same number of times as the number of the maximum virtual connections, and transmitting divided data to the printing device through the real virtual connections; and
   a first network driver part for physically connecting to the printing device; wherein the printing library comprises:
   a data input part for receiving the print data and obtaining the information on the total length of the print data and the maximum virtual connections;
   a first connection processing part for attempting the virtual connections to the printing device by repeatedly attempting as many threads as the number of the maximum virtual connections, if the virtual connection succeeds, increasing the number of real virtual connections by one connection, while if the virtual connection fails, terminating the generated threads, and if the number of real virtual connections is at least one, calculating a chunked length (CL) of the divided data for the print data and offsets where the divided data are located based on the total length of the print data and the number of the real virtual connections; and
   a data transmitting part for transmitting the information on the total length of the print data, the information on the chunked length of the divided data, the information on the offsets, and the divided data to the printing device through the virtual connections.

6. An apparatus for transmitting print data from a host to a printing device through a network using multiple virtual connections, comprising:
   a printing library for receiving the print data and obtaining information on a total length (TL) of the print data and the number of maximum virtual connections (MC), acquiring the number of real virtual connections RC by attempting the virtual connections to the printing device the same number of times as the number of the maximum virtual connections, and transmitting divided data to the printing device through the real virtual connections; and
   a first network driver part for physically connecting to the printing device; wherein the printing device comprises:
   a second connection processing part for receiving and processing connection and release requests from the printing library;
   a data receiving part for receiving the information on the total length of the print data, the information on the chunked length of the divided data, the information on the offsets where the divided data are located, and the divided data;
   a second storage for matching the divided data to the offset information and storing the matched divided data;
   a data transferring part for receiving and outputting all data from the second storage part;
   a printing part for receiving the print data from the data transferring part and performing a printing operation accordingly; and
   a second network driver part for physically connecting the host and the printing device.

7. The apparatus as claimed in claim 5 or 6, wherein the host and the printing device are physically connected through any one of a parallel port, an IEEE 1394 port, a Universal Serial Bus (USB) port, or a Bluetooth port.

* * * * *